F. G. NIND & F. JULYAN.
PAPER FOLDING MACHINE.
APPLICATION FILED JAN. 7, 1909.
1,047,688.
Patented Dec. 17, 1912.
9 SHEETS—SHEET 2.
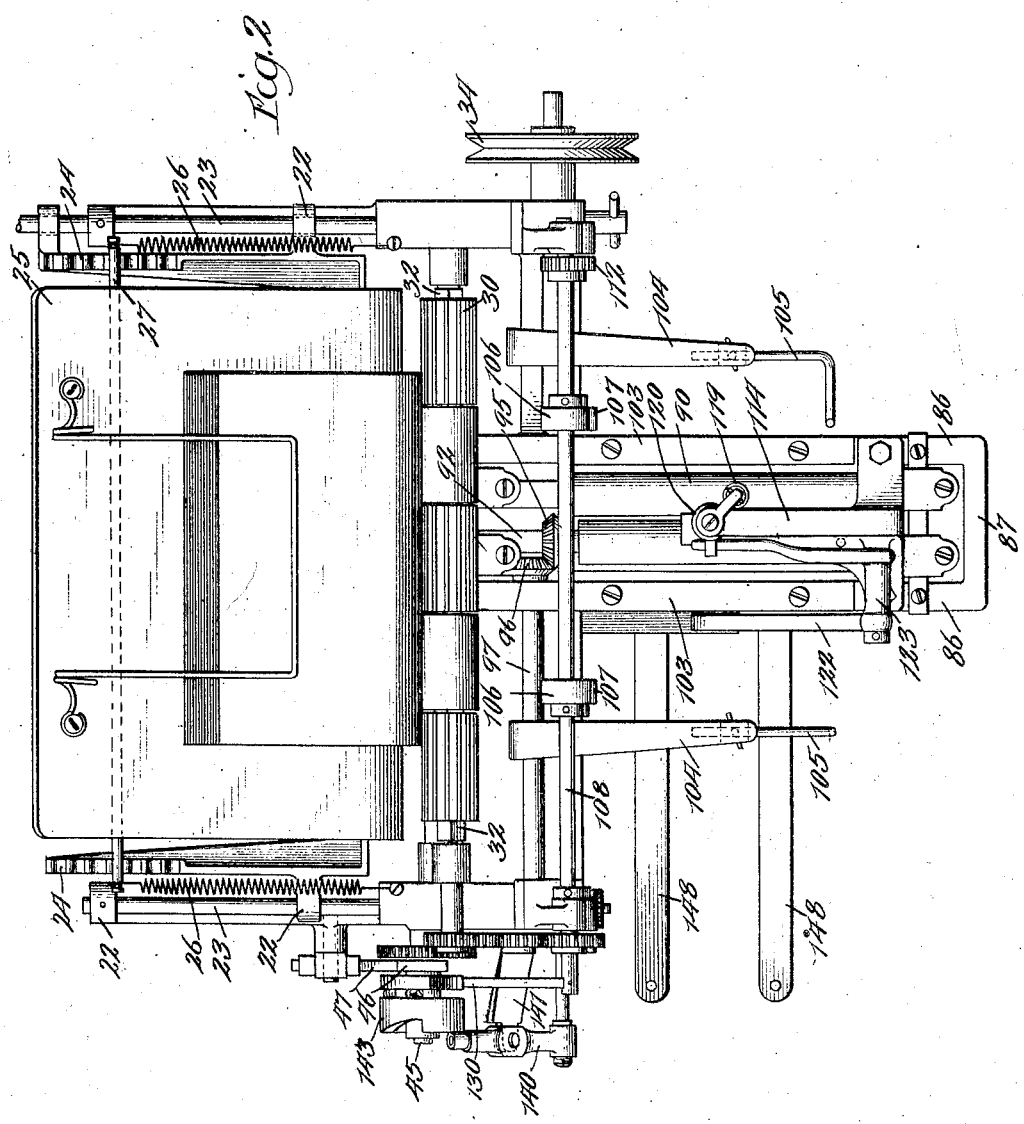

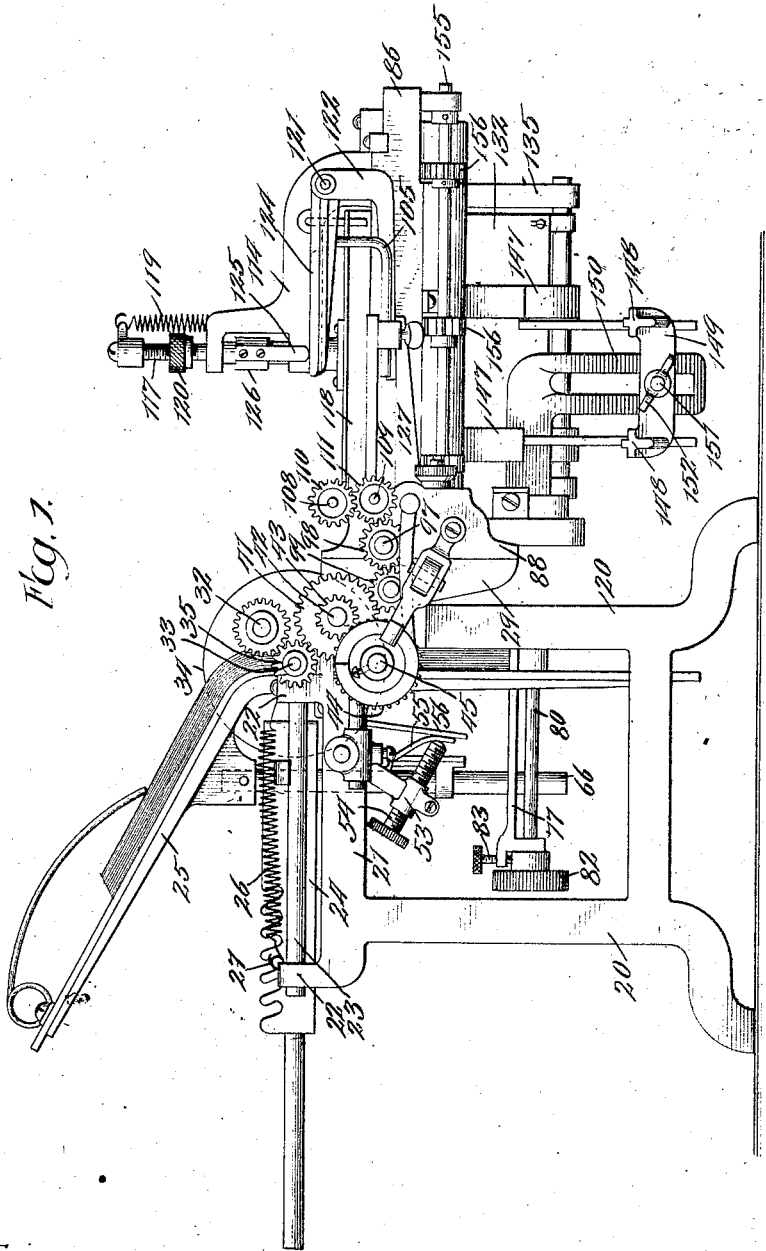

F. G. NIND & F. JULYAN.
PAPER FOLDING MACHINE.
APPLICATION FILED JAN. 7, 1909.
1,047,688.
Patented Dec. 17, 1912.
9 SHEETS—SHEET 3.
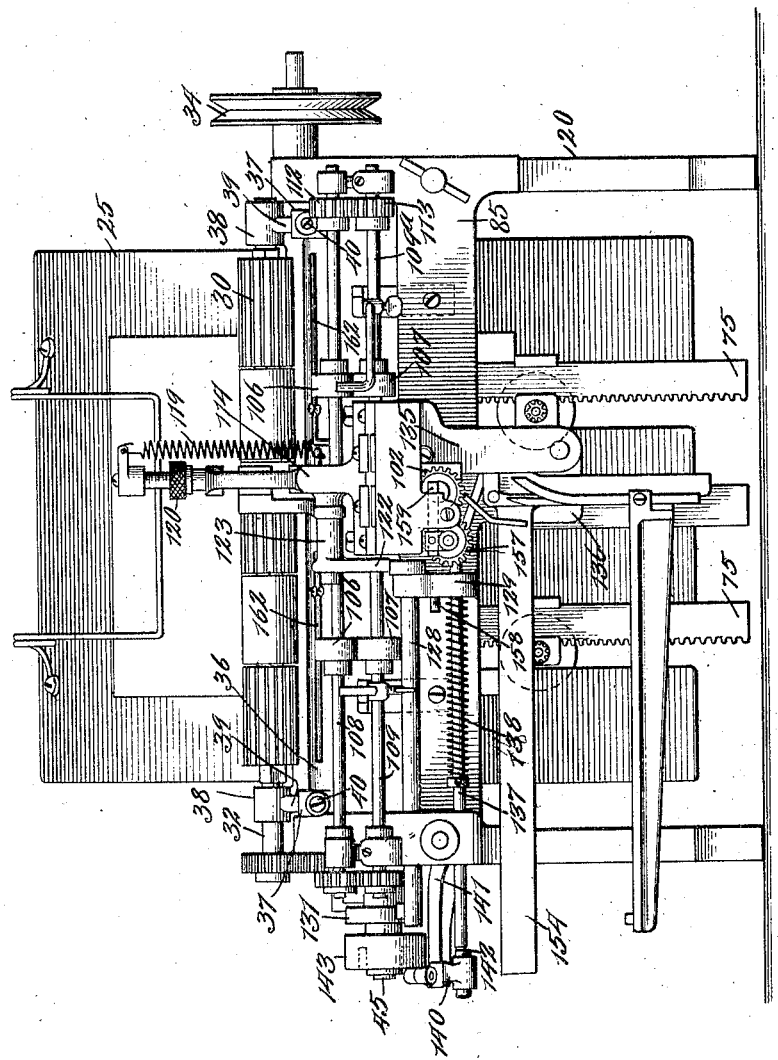

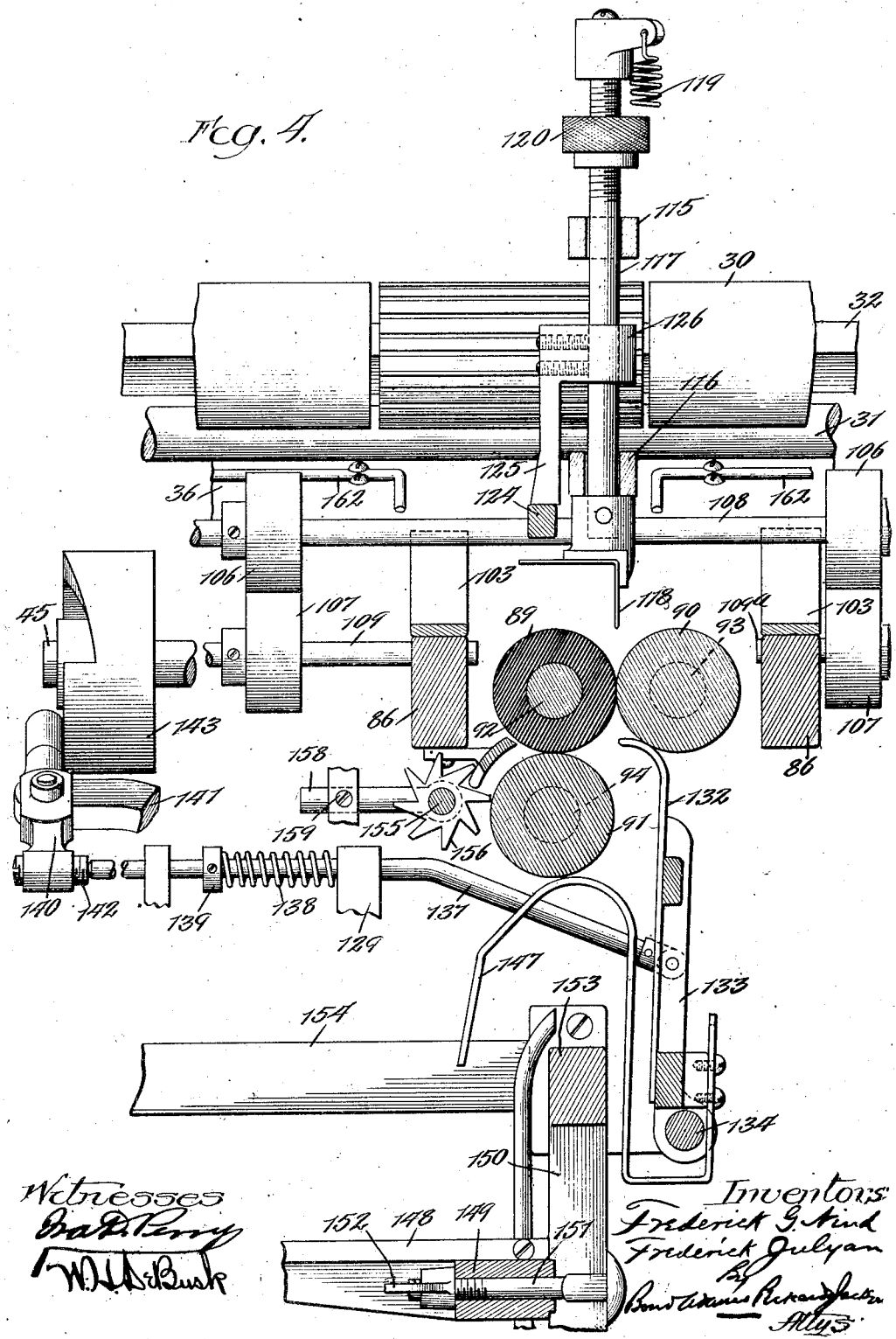

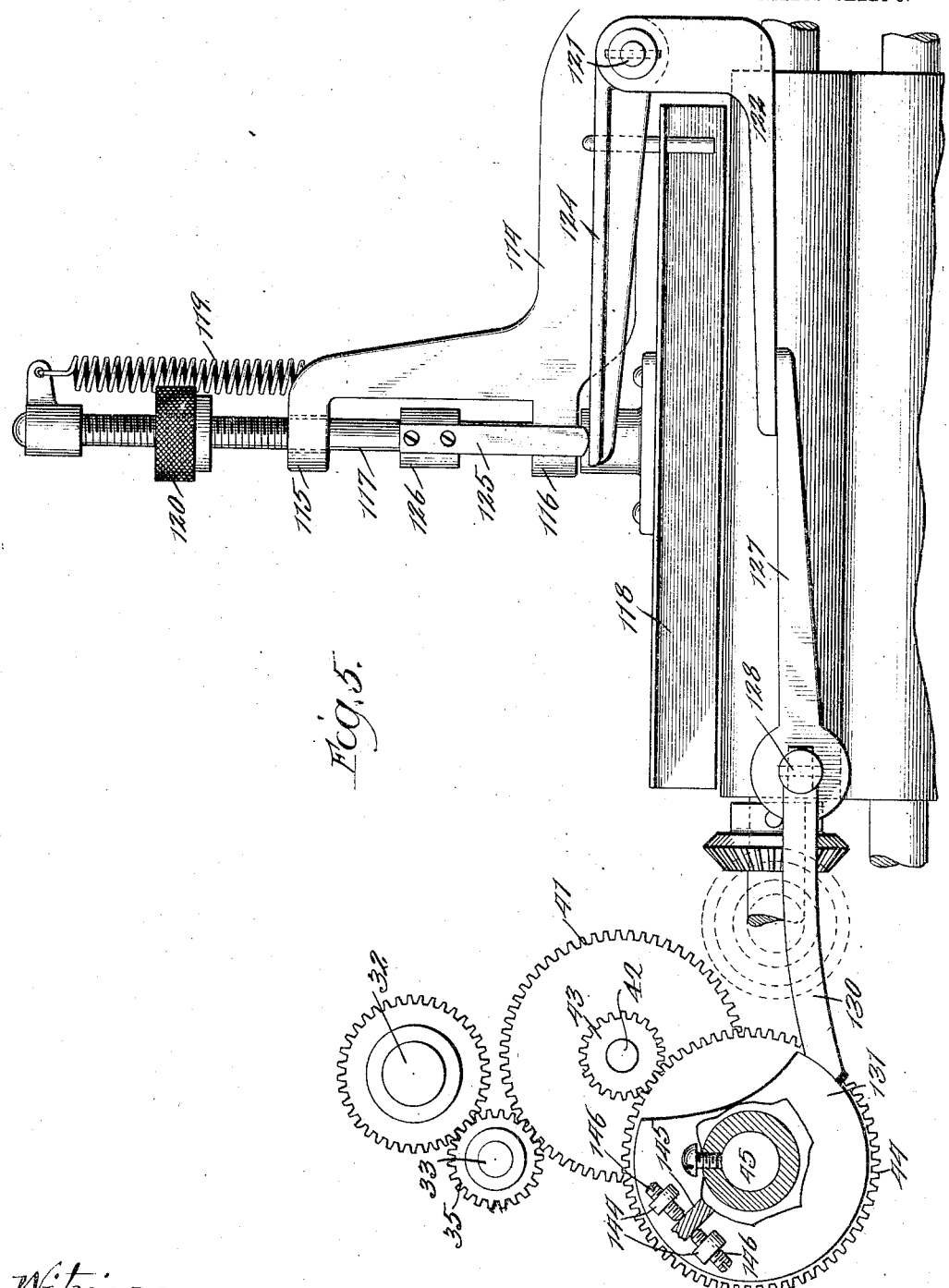

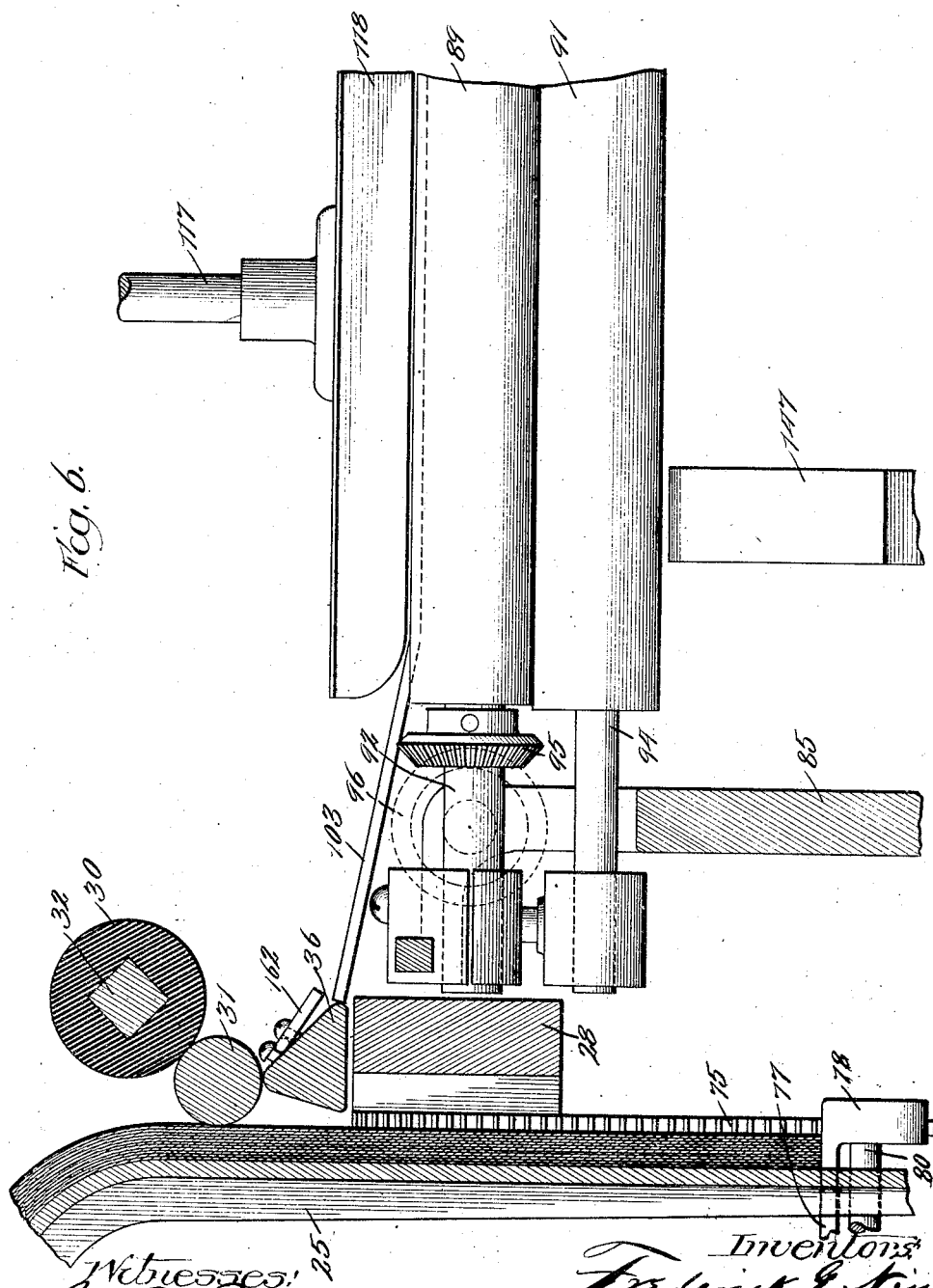

F. G. NIND & F. JULYAN.
PAPER FOLDING MACHINE.
APPLICATION FILED JAN. 7, 1909.
1,047,688.
Patented Dec. 17, 1912.
9 SHEETS—SHEET 7.
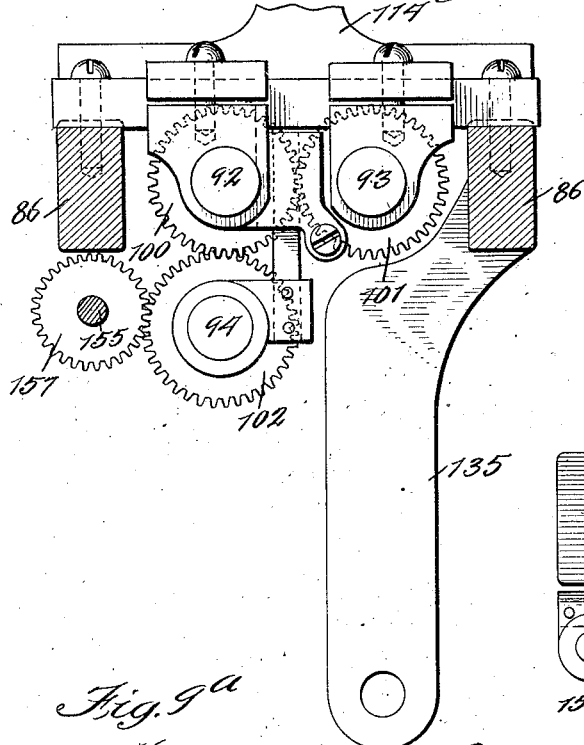
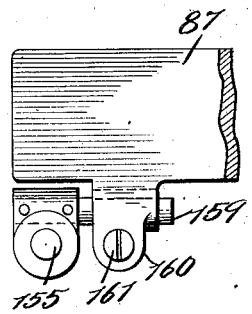
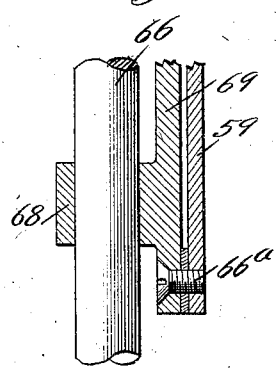
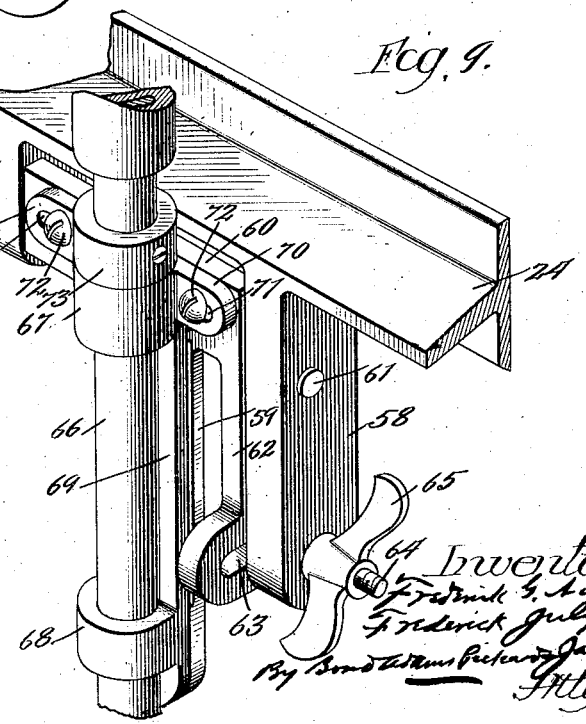

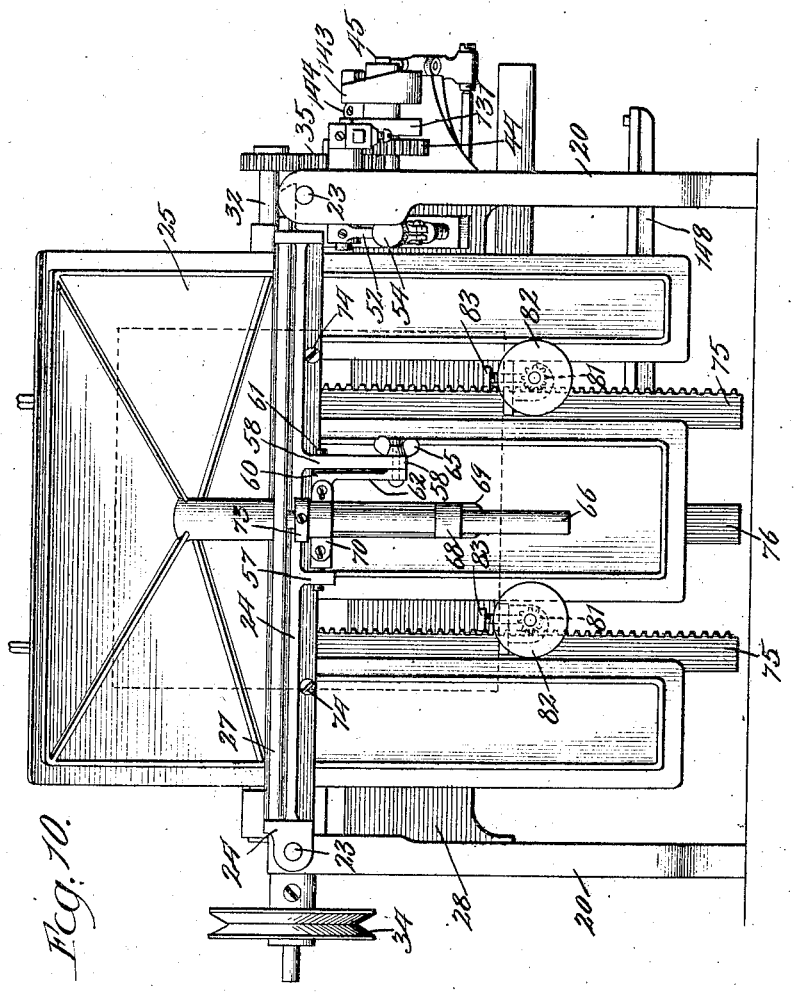

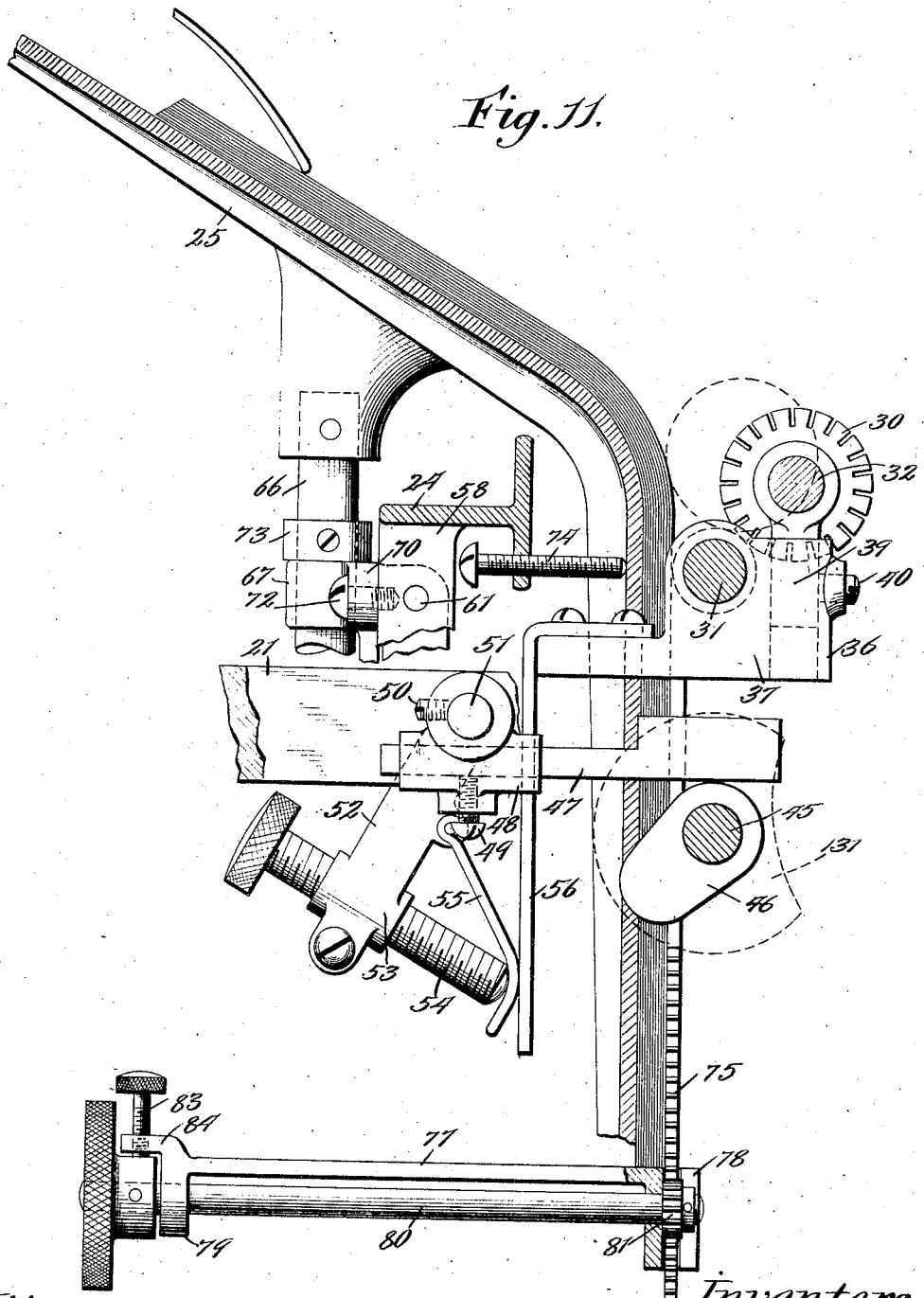

UNITED STATES PATENT OFFICE.

FREDERICK G. NIND AND FREDERICK JULYAN, OF CHICAGO, ILLINOIS, ASSIGNORS, BY MESNE ASSIGNMENTS, TO THE AMERICAN MULTIGRAPH COMPANY, OF CLEVELAND, OHIO, A CORPORATION OF OHIO.

PAPER-FOLDING MACHINE.

1,047,688. Specification of Letters Patent. Patented Dec. 17, 1912.

Application filed January 7, 1909. Serial No. 471,138.

*To all whom it may concern:*

Be it known that we, FREDERICK G. NIND, a subject of the King of Great Britain, and FREDERICK JULYAN, a citizen of the United States, both residing at Chicago, in the county of Cook, State of Illinois, have invented certain new and useful Improvements in Paper-Folding Machines, of which the following is a specification, reference being had to the accompanying drawings.

This invention relates to paper-folding machines and particularly to that class of machines designed primarily for folding small sheets of paper such as circulars, letters, &c., so as to adapt them for insertion in envelops.

The machine embodying our invention is of the same general type as those shown in Letters Patent No. 839,313, dated December 25, 1906, and No. 840,509, dated January 8, 1907, both granted upon our application, and the invention has for its object to improve said type of machine in construction and operation.

Those things that we believe to be new will be set forth in the claims.

We have found it convenient to show and describe a complete folding machine including the means for feeding the paper thereto. Such feeding mechanism proper, however, is not claimed herein, but in our divisional application No. 540,964, filed January 31, 1910.

In the drawings:—Figure 1 is a side elevation of the machine; Fig. 2 is a plan view of the machine; Fig. 3 is an end view of the machine; Fig. 4 is an enlarged detail, partly in section, and some of the parts partly broken away, showing the relative arrangement of the rolls by which the final folds are imparted and parts coöperating directly therewith, and showing also other portions of the machine,—the entire view being somewhat diagrammatic; Fig. 5 is an enlarged detail, showing in side elevation the rolls that impart the final fold to a sheet, the blade that forces the sheet into the bite of such rolls, (the supporting frame for such rolls being omitted,) and some of the operating mechanism; Fig. 6 is an enlarged detail, showing in side elevation and partly broken away, the rolls and blade shown in Fig. 5, their supporting frame being omitted as in Fig. 5, and showing in vertical section the rolls that impart the first fold to a sheet and a portion of the means for supporting a pile of sheets to be folded; Fig. 7 is an enlarged detail, partly in section, of a portion of the delivery end of the machine, and showing the gears at the inner ends of the set of three folding rolls and another gear driven therefrom that drives a shaft to which spur wheels are attached for engaging and moving out of the way the folded sheets; Fig. 8 is a detail, illustrating the manner of securing the outer end of the shaft that carries the toothed wheels that engage the sheets after the final folding operation; Fig. 9 is an enlarged detail, being a perspective view of the means employed to permit the follower-plate that bears against the pile of sheets to be adjusted on its pivots; Fig. 9ᵃ is a detail, being a vertical section through the lower end of the means that support the rod attached to the follower-plate; Fig. 10 is an end view of the machine showing more particularly the follower-plate and the devices employed for adjustably securing it in position, and Fig. 11 is an enlarged detail, being a sectional side elevation of the follower plate, the dislodging roll and the means for swinging it, the section-planes of the shafts being in front of the plane through the follower, and the section plane of the shaft 46 being in front of the plane on which the shafts 31 and 32 are cut.

Referring to the several figures of the drawings, in which corresponding parts are indicated by like reference characters;—20 indicates the supporting standards, a pair of such being provided at each side of the machine and each pair having at their upper ends one of the longitudinally-extending side-bars of the frame of the machine, such side-bars being indicated by 21. Each of these side-bars is provided with upwardly-extending lugs 22 in which are secured bars 23 upon which is slidingly mounted a frame 24, to which frame is adjustably secured in the manner hereinafter specifically described, a follower-plate 25, said follower-plate consisting as shown of a depending vertical portion and a rearwardly-inclined upper portion. The follower-plate is adapted to press against a pile of sheets of paper so as to hold said pile in position to be engaged by the set of folding rolls that imparts the initial fold made by the machine to the sheets. This plate is held against the sheets with the required degree of pressure by a pair of coiled springs 26 secured at their forward ends to the fixed frame of the machine and at their other or rear ends to a cross-bar 27 that is adjustably held in any one of a series of notches in the side-bars of the sliding frame 24, as clearly shown in Figs. 1 and 2.

The side-bars 21 of the supporting frame are connected near their forward ends by a cross-bar 28. At opposite sides of the supporting frame, are projecting brackets 29 against which the framework carrying the mechanism for imparting the second and third folds to the sheets rests and to which such mechanism is secured, as hereinafter explained.

30—31 indicate the two rolls that are adapted to give the first fold to the sheets of paper fed through the machine, the shafts of said rolls being indicated by 32—33, respectively. The roll 31 is preferably a smooth surfaced solid metal roll, while the roll 30 is made of yielding material, and is made up of short sections, such sections being mounted on a squared portion of the shaft so as to hold them securely thereon and prevent any independent rotation of the sections. The squared section of the shaft on which this roll 30 is mounted is clearly shown in Figs. 2, 3 and 4. As shown in the drawings, particularly in said Figs. 2, 3 and 4, some of the sections composing this roll 30 are longitudinally slit or grooved, while other sections have a smooth surface. We have found that in practice it is very desirable to have this roll made up of sections for the reason that we find that under certain conditions and with certain kinds of sheets the paper is better acted upon by the roll to cause it to be fed accurately between the two rolls 30 and 31 if certain portions of the roll are slit or roughened while certain other portions are smooth and plain, and, as it is frequently desirable to have one kind of section in one place on the roll and another kind of section in another place, we do not confine ourselves to the alternate arrangement of smooth and slitted sections as shown in the drawings but it will be understood that such sections will be arranged on the squared shaft as may be found best for each particular batch of work to be done. At one end the shaft 33 of the smooth roll 31 is extended and has secured thereon a suitable driving pulley 34, and at its other end it has a pinion 35. 36 indicates a rocking frame consisting of a bar extending parallel with the smooth roll 31 and pivotally hung from the shaft of such rear roll by blocks 37 (see Fig. 11) formed with such bar.

38 indicates bearings for the shaft 32 of the sectional roll 30, which bearings have depending lugs 39 that fit in suitable openings in the said blocks 37 and are held there by set-screws 40. By this means of supporting the shaft 32, the roll can be slightly adjusted closer to or farther from the smooth roll 31, as required, and secured in the proper adjusted position by the said set-screws 40. This construction also admits of the ready detachment of the shaft 32 to permit the changing about or the renewal of the sections of the roll 30, as may be required.

41 indicates a gear rotatable upon a short stub-shaft 42 projecting out from one side of the main supporting frame, said gear being in mesh with the pinion 35 on the shaft 33. On the same stub-shaft 42 and secured to the face of the gear 41 is a pinion 43 which meshes with a large gear 44 rotatably mounted upon a stub-shaft 45. This gear 44 has attached to its outer face so that it will move with such gear a cam 46 (see Figs. 2 and 11) upon the surface of which cam rests an arm 47 that projects into a hollow block 48 and is adjustably secured in any desired position by means of a set-screw 49. This hollow block depends from and is secured, by a set-screw 50 or otherwise, to a short rock-shaft 51 journaled in one of the side-bars 21 of the supporting frame. To the inner end of this short rock-shaft 51 is suitably affixed a swinging arm 52 having at its lower end a screw-threaded head 53 through which passes a screw-threaded rod 54 that bears against a short swinging plate 55 pivotally attached at its upper end to said swinging arm 52. This plate 55 bears against a rigid downwardly-extending arm 56 that is secured at its upper end to a projecting portion of the frame 36 that is journaled on the shaft 33 and supports the shaft of the sectional roll 30.

From the construction described, it will be seen that as the shaft of the roll 31 is rotated when power is applied to it through the pulley 34, the gearing described will cause a rotation of the cam 46 on the stub-shaft 45 and such cam will, through the arm 47, cause a turning of the rock-shaft 51, and, as this takes place, the arm 52 will be moved and force forward the arm 56, causing the frame 36 to turn on its pivotal support and bring the sectional roll 30 more directly over the plain smooth roll 31 so that such sectional roll will be in the position indicated by dotted lines in Fig. 11 and will engage the outermost sheet of the pile of sheets to be folded, causing such sheet to buckle and pass between the two rolls 30—31, said roll 30 being constantly driven of course by the engagement of its gear with the pinion 35 on the positively driven shaft 33. The extent to which the sectional roll 30 will be moved toward the pile of sheets will be governed by the adjustment of the screw 54. The provision of the swinging plate 55 with which such screw engages serves to take up wear and to apply the pressure better than if the screw impinged directly against the rigid arm 56.

Before considering the mechanism by which the subsequent folds are imparted to the sheets of paper, the devices for permitting varied adjustment of the follower-plate and the means for supporting the pile of sheets will be described. In apparatus of this character, it has been found that it is essential to provide means for adjusting the follower-plate in various ways so as to perfectly accommodate it to different kinds of paper and to varying atmospheric conditions, which, as is well known, will affect a pile of sheets in various ways. It is necessary in some instances to provide that one edge of the follower plate be slightly closer to the folding rolls than the other; it is necessary at times to have either the lower portion or the upper portion of the vertical part of the follower-plate moved in farther than the other portion; and it is also necessary that the follower-plate be adjustable vertically up and down as a whole,—all of these adjustments being provided for in our machine.

The cross-bar portion of the sliding frame 24 (see Fig. 10) is provided with two downwardly-extending ears 57 and 58, the ear 57, in the construction shown, being much shorter than the ear 58. These ears are each placed a short distance from the center of the cross-bar of the sliding frame 24. Between these two ears 57—58 fits an arm 59 having a horizontal head portion 60 at its upper end that substantially fills the space between the two ears 57—58 and this device is pivotally suspended on a pin 61 that passes through it and through said ears. From the head portion 60 at one side depends a piece 62 that lies close to the inner face of the long ear 58, which piece 62 is enlarged at its lower end and provided with a slot 63 through which a headed bolt 64 passes the bolt also projecting through the long ear 58 and being adapted to have screwed upon it a thumb-nut 65. By this construction it is evident that the arm 59 can be swung as desired upon its pivot pin 61 and held in any desired position by turning up the thumb-nut 65.

66 indicates a heavy rod suitably secured to the under face of the inclined portion of the follower-plate 25. This rod passes through and fits snugly in two eyes 67 and 68 that are formed with an arm 69 that lies over the arm 59. The arm 69 is pivotally connected at its lower end to the lower end of the arm 59, the pivot being indicated by 66ª, and at its upper end behind the upper eye 67 it is provided with two ears 70 that lie against the head portion 60 of the arm 59, said ears being provided with short slots 71 through which pass set-screws 72 that enter suitable screw-threaded holes in said head portion 60. This construction obviously permits, when the said set-screws 72 are loosened, a slight lateral adjustment of the arm 69 so as to move the rod 66 and the follower-plate carried thereby toward one side or the other of the machine, in which adjusted position it can be set by the turning of said set-screws 72. The rod 66 is provided with a collar 73 that is adjustably secured to it, preferably by means of a set-screw, as shown in Fig. 9, and upon the location of this collar on the said rod depends the extent to which the rod can move downward in its said eyes 67—68.

74 indicates two screws that pass through holes in the cross-bar portion of the sliding frame 24, each of said screws being located as shown in Fig. 10 about midway between one side bar of said frame and the center of the cross-bar portion thereof. These screws are adapted to be pressed against the face of the vertical portion of the follower-plate and by screwing up one screw a little more than the other the follower-plate can be turned slightly on its rod 66 as an axis so as to press more tightly toward the folding rolls 30—31 at one side than at the other.

By the construction described, it will be seen that the follower-plate can be raised or lowered, as desired, and held in its adjusted vertical position by securing the collar 73 to the rod 66; that the follower-plate can be swung slightly on the horizontal pivot pin 61 and can be secured after being swung to the desired position by means of the thumb-nut 65; that it can be given a slight side swing on the pivot 66ª and secured after being so swung by setting the screws 72; and that one side of the vertical portion of the follower-plate can be advanced slightly closer to the folding rolls 30—31 than the other by proper adjustment of the screws 74,—all of which adjustments permit an almost universal movement of the follower-plate to adapt it to all kinds and conditions of sheets and climatic changes which affect the free movement of said sheets.

75 indicates two vertical rack-bars secured in any suitable manner to the rear face of the cross-bar 28 of the supporting frame and 76 indicates another bar but without the teeth of the bar 75, said latter bar being also secured to said cross-bar 28 and being located between the two rack-bars 75. The upper ends of these bars extend almost to the plain metal roll 31. These three bars serve to hold the pile of sheets in a vertical position when pressed against them by the vertical portion of the follower-plate 25. The two rack-bars serve also as means for adjustably supporting devices upon which rest the lower edges of the pile of these sheets. As shown (see Fig. 11) these paper-supporting devices consist of two arms 77, one for each rack-bar 75, each arm having at its inner end a head 78 that embraces one of the rack-bars and having near its other end a lug 79. Through the lug 79 and the head 78 passes a rotatable operating rod 80 that carries at one end a pinion 81 suitably affixed to said rod and adapted to mesh with the rack-bar. This rod is provided at its outer end with a wheel or handle 82 by the turning of which the rod 80 is rotated, and, through the engagement of the pinion 81 with its rack-bar, the rod and its attached supporting arm 77 is moved up or down on the said rack-bar. When the desired position has been reached, the device is set in that position by means of a small set-screw 83 that passes through a horizontal lip 84 and bears against the hub of the wheel or handle 82. By these adjustable supports, the pile of paper can be held in proper position so that the central portion of each sheet, or that portion across the sheet to which it is desired to impart the primary fold, will be properly presented to the said folding rolls 30—31.

The mechanism for imparting the additional folds to the once-folded sheet is supported by a framework that is preferably bolted or otherwise removably affixed to the brackets 29. This framework consists of a heavy cross-bar 85 that stands a little distance away from the cross-bar 28 of the other supporting framework, from which bar projects forwardly two bars 86 spaced a distance apart and adapted to receive between them the three folding rolls hereinafter described. These two bars 86 are preferably connected together by a cross-bar 87 formed integral with them (see Fig. 2). At the ends of the cross-bar 85 are formed brackets or heads 88 that rest against the other brackets or heads 29, the brackets or heads 88 serving as bearings for certain rods and shafts hereinafter mentioned.

89, 90 and 91 indicate three folding rolls, the rolls 89 and 90 acting to give the second fold to a sheet of paper,—that is the first fold after the once-folded sheet has passed through between the rolls 30—31,—and the rolls 89 and 91 being adapted to impart the final fold to the sheet. The roll 89 is preferably of yielding material while the rolls 90—91 are preferably smooth metal rolls. The shafts of these rolls are indicated respectively by 92, 93 and 94. The rolls 89—90 lie directly between the horizontal forwardly-extending side bars 86. All of these three rolls are horizontally-disposed, and extend in a plane at right angles to the plane of the first folding rolls. The shaft 92 of the roll 89 is provided near its inner end with a bevel gear 95 with which meshes another bevel gear 96 on the end of a shaft 97, the other end of which is provided with a gear 98, and this gear is driven through an idler pinion 99 which meshes with the large gear 41 hereinbefore referred to. The outer end of the shaft 92 of the roll 89 (see Fig. 7) is provided with a gear 100 which is in mesh with gears 101 and 102 on the shafts 93 and 94, respectively, whereby of course all of said rolls 89, 90 and 91 will be caused to rotate together.

103 indicates guide strips screwed or otherwise suitably secured upon the tops of the forwardly-extending bars 86 and projecting at their rear ends in such position as to receive sheets that pass from between the rolls 30—31 and conduct them into position over the two rolls 89—90.

104 indicates rigid arms one at each side of the forwardly-extending bars 86, said arms being suitably secured to the cross-bar 85. The forward end of each of these arms 104 has connected to it an adjustable finger 105, the end of which is turned, so that these fingers form stops for the sheets of paper that are fed forward above the rolls 89—90.

106—107 indicate two pairs of guide rollers, the rollers 106 being fast on a shaft 108 and the rollers 107 being fast on shafts 109 and 109ª. These shafts 108 and 109 have attached at one end pinions 110—111, respectively, which intermesh and are driven through the meshing of the pinion 109 with the pinion 98 (see Fig. 1). These rolls 106—107 act to advance the sheet of paper as it issues from between the first folding rolls 30—31. As shown in Fig. 3, the shafts 108 and 109ª are provided with pinions 112—113, respectively, that intermesh. It is therefore evident that by the arrangement of pinions the two short shafts 109 and 109ª and the long shaft 108 will be driven together so that the two pairs of rollers 106—107 will properly coact. The short shafts 109 and 109ª have their inner ends suitably journaled in the respective forwardly-extending bars 86, while the shaft 108 extends clear across the machine and lies over said bars.

114 indicates a curved arm having a base portion which lies over the two forwardly-projecting bars 86, to which bars said base portion is secured (see Fig. 2). This curved arm extends from near the outer portion of these bars 86 to a point about midway of the length of the folding rolls 89—90, and in eyes 115—116 formed with such curved arm is mounted so as to be movable longitudinally therein a rod 117 which has suitably secured to it at its lower end a long blade 118 which lies parallel with and directly over the bite of said rolls 89—90 and is adapted when forced down upon a sheet of paper lying over said rolls to press said sheet in so as to be caught between the rolls. 119 indicates a coiled spring suitably connected to the upper end of said rod 117 and at its lower end secured to one side of the arm 114. The tendency of this spring is to force said rod and attached blade downward. The upper portion of the rod is screw-threaded, and upon such portion is a nut 120 which is adapted to strike against the upper face of the eye portion 115 and thereby regulate the amount of downward movement of such rod. The extent to which the rod can be forced down can be regulated of course by adjusting said nut.

121 indicates a pin fixed in one side of the arm 114 near the base portion thereof upon which pin is pivotally mounted a bent lever 122 which, as shown in Figs. 2 and 3, lies at one side of one of the forwardly-projecting bars 86. Formed with this bent lever is a long hub portion 123 that is journaled on said pin 121, and at the inner end of this long hub portion is an arm 124 which is preferably formed integral with the parts 122—123. The free end of this arm 124 projects beneath a block 125 which is formed with a short sleeve portion 126 that surrounds the rod 117, said block and sleeve being securely affixed to said rod by screws, as shown in Fig. 5 or otherwise.

127 indicates an arm that is made fast to a rock-shaft 128 that is journaled at one end in a block 129 formed with or secured to the cross-bar 85, and journaled at its other end in that one of the brackets 88 adjacent to the train of gearing that is shown in Fig. 1. At the latter-named end of the shaft is rigidly affixed an arm 130 whose free end lies in contact with a roller 131 having a portion of its periphery cut away, as shown in Fig. 5, to form a cam surface. During all of the time that the free end of the arm 130 is out of engagement with the cam portion,—which will of course be for a greater portion of the time,—the shaft 128 will be held so as to hold up the arm 127, which, bearing against the under side of the bent arm 122, will hold such arm elevated, and by the pressure of the arm 124 against the block 125 will hold up the rod 117 and its attached blade. But as soon as the end of the arm 130 is released by passing onto the cam surface of the roller 131, the tension of the coiled spring 119 will be sufficient to pull down the rod 117 and force the blade carried thereby into the bite of the rolls 89—90, as will be well understood. This cam roller 131 is mounted on the same stub-shaft 45 as the cam 46 and is secured to the outer face of said cam 46 so as to rotate therewith.

132 indicates a blade having a turned upper edge directed toward the bite of the rolls 89—91 to direct the sheet of paper passing between the rolls 89—90 between the rolls 89—91 for the purpose of imparting the final fold thereto. This blade 132 consists of a sheet of metal of approximately the same length as the length of the said last-mentioned rolls, and it is affixed in any suitable manner to a light metal frame 133 that is pivotally attached to a rod 134 held at one end in the lower end of an arm 135 depending from near the outer end of one of the forwardly-projecting bars 86 and held at the other end in a heavy depending piece 136 that is preferably formed with the cross-bar 85. The frame 133 holding this blade 132 has connected with it at its inner end a rod 137 that is longitudinally movable in bearings furnished by the block 129 that is carried by the cross-bar 85 and by one of the brackets 88. Surrounding this rod 137 is a coiled spring 138 that bears at one end against the block 129 and at the other end against a collar 139 (see Fig. 4) that is suitably secured to said rod. The effect of this spring is to normally push the rod outward so as to draw the curved end of the blade 132 in toward the bite of the rolls 89—91, but the rod is normally held pushed in against the tension of the spring by an arm 140 pivoted substantially at its center to the end of a rigid arm 141 projecting out from the outer face of the bracket 88 through which the rod 137 passes. One end of this pivoted arm 140 is provided with an adjusting screw 142 that bears against the end of the rod 137 while the other end of such arm 140 bears against the outer face of the large roller 143 in which face is cut, as clearly shown in Fig. 4, a cam portion. When the end of the arm enters the said cam portion, the force of the spring pressing on the collar 139 on the rod 137 will force such rod outward and draw in the blade 132 toward the bite of the rolls 89—91. When the end of the arm 140 is out of the cam portion referred to, the rod 137 will of course be forced back to the position shown in Fig. 4. The adjusting screw 142 is provided to regulate to a fine degree the positions of the blade 132.

The cam roller 143 is mounted on the same stub-shaft 45 that carries the cams 46 and 131, and it is connected with the cam 131 so as to be movable therewith. It will be understood that all of these cams on this stub-shaft 45 are so connected with the large gear 44 thereon as to be driven with and by such gear. The manner of connecting up the two cam rollers 131 and 143 so that they will move together is shown in Fig. 5, in which 144 indicates two small ears on that face of the cam roller 131 lying next to the cam roller 143, and 145 indicates an ear projecting out from the inner face of the cam roller 143 and between the two ears 144 that project out from the adjacent face of the cam roller 131. Through each of the ears 144 is a small set-screw 146, the ends of which screws are adapted to bear against the ear 145 on the cam-roller 143. By unscrewing one of the screws and screwing up the other, it is evident that the cam roller 143 can be rotatably adjusted one way or the other as may be required so as to have its cam portion brought into exactly the right position to effect the desired operation of moving the rod 137 at exactly the right period of time.

147 indicates two bent metal strips secured to the outer face of the frame 133 that carries the blade 132 and bent around under such frame, as shown in Fig. 4, and into such position as to act as guides to direct the completely-folded sheets down onto the receiving table. The receiving table referred to consists, in the construction shown, of two arms 148 connected together at their inner ends by a cross-bar 149 which device is adjustably connected to a slotted vertical hanger 150 by means of a bolt 151 passing through the slot in the hanger, which bolt can be tightened up by a thumb-nut 152. The slotted hanger referred to has formed at its upper end an arm 153 that projects toward the center of the machine and is bolted or otherwise secured to the heavy depending piece 136 before referred to.

154 indicates a guard strip secured at one end to said heavy depending piece 136 and serves to prevent the folded sheets that are delivered upon the arms 148 from moving off at the inner side of said arms.

155 indicates a shaft provided with one or more star shaped wheels 156,—preferably two, as shown in Fig. 1,—these star-shaped wheels being so located as to properly engage the folded sheet as it emerges from between the rolls 89—91, and assist in directing such sheet downward, and, just as it settles upon the table formed by the arms 148 to engage the upper edge of the sheet and push it forcibly in a direction toward the delivery end of said table. This shaft 155 has secured upon it a gear-wheel 157 (see Fig. 7) which is adapted to be driven by the gear 102 on the roll shaft 94. The inner end of this shaft 155 is suitably journaled in a bearing at the end of a short rod 158, which short rod is adjustably held by a set-screw 159 in an opening in the block 129 that projects out from the face of the cross-bar 85, while the outer end of the shaft (see Fig. 8) is secured in a bearing on the end of another short rod 159 that is adjustable in and out of a divided ear 160, the two parts of the ear being adapted to be compressed together to hold the rod by a screw 161. The ear 160 referred to depends from the cross-bar 87 that connects the outer ends of the bars 86. This manner of mounting the shaft permits a slight adjustment of the shaft, to insure the toothed wheels 156 being located in exact and proper relation to the roll 91.

162 indicates two pieces of heavy wire lying upon and parallel with the rocking bar 36 that carries the folding roll 30, each of said pieces having turned ends, as clearly shown in Fig. 4. These pieces are secured to the bar 36 in such a manner as to permit them to be axially rotated to raise their turned ends more or less above the surface of said bar 36. As shown, they are each held to the bar by a pair of small screws. They are provided for the purpose of raising the once-folded sheet more or less above the bar 36 so as to more perfectly direct the folded sheet down onto the guides 103 on top of the forwardly-extending bars 86.

In operation, a pile of sheets is placed on edge on the arms 77, and the follower-plate is adjusted in any one or more of the various ways stated to cause it to bear against such sheets in the desired manner, and thereafter power will be applied to the pulley 34, rotating the smooth roll 31, which will of course through the meshing of the gear on the shaft of that roll with the gear on the shaft of the roll 30 cause a rotation of such roll 30, and, at the proper period of time, such roll 30 is caused, by the cam 46 and the mechanism directly acted upon by such cam, to swing toward and press against the pile of sheets, causing the outermost one of the pile to be drawn down and buckled so as to be engaged by the two rolls 30—31, through the bite of which rolls it will pass. From such rolls, it will be properly deflected by the turned ends of the axially-rotatable wires or rods 162 onto the guide-strips 103, and be caught between the two pairs of small rollers 106—107 which will move it forward over the horizontal forwardly-projecting rolls 89—90, the sheet being stopped at the proper moment by the up-turned ends of the fingers 105. When in this position, the once-folded sheet will lie over the said rolls 89—90, so that when pressed down between them it will be caught along a line about one-third from one of the side edges of the sheet. At the instant it is so stopped over these last-named rolls, the downwardly-acting blade 118 is forced down by the pull of the coiled spring 119 which has been permitted to perform this office by reason of the free end of the arm 130 having entered the cam portion of the roller 131, which, as before explained, allows the rock-shaft 128 to turn sufficiently to release the upward pressure of the arm 127 upon the bent arm 122. The sheet continues to be drawn through between the rolls 89—90 until that portion of it at which the third fold is to be made comes opposite the bite of the rolls 89—91, at which instant the blade 132 is forced toward the bite of such rolls by reason of the pivoted arm 140 having entered the cam portion cut in the face of the roller 143, which, as before explained, allows the coiled spring 138 on the said rod 137 to force said rod outward. This movement of the blade 132 of course forces the paper in between said last-named folding rolls, and the folding operation is completed. As the sheet passes out from between said rolls, its leading edge is caught by the toothed wheels 156 and carried downward between such toothed wheels and the roll 91, being properly directed by the bent arms 147 onto the table 148, and, as it settles on such table, its upper folded edge will be pushed forward by the toothed wheels so as to provide room behind it for the next succeeding sheet.

What we claim as our invention and desire to secure by Letters Patent is:—

1. A paper folding machine having a pair of horizontally arranged rolls journaled in a suitable frame, a support secured upon the frame and projecting over the rolls, a vertically movable rod held in said support, a blade carried by said rod and adapted to force a sheet of paper between the rolls, a spring acting on said rod tending to force it downwardly, a pivoted lever at one side of the frame, an arm connected to said lever and adapted to move said rod and attached blade upwardly against the pressure of the spring, and means for moving the lever.

2. In a folding machine, the combination of means for supporting a pile of sheets, a pair of folding rolls, a rocking bar in which one of said rolls is journaled, an adjustable device on the face of said rocking bar adapted to hold a sheet which is passing between the rolls away from said bar and guide it in its passage from the rolls, said adjustable device comprising a rod on the face of the rocking bar, which rod has its ends turned at an angle to the body.

3. In a paper-folding machine, the combination with means for supporting a pile of sheets, of a pair of folding rolls, a rocking bar in which one of said rolls is journaled, an adjustable device on the face of said rocking bar adapted to hold a sheet passing between said rolls away from said bar and guide it in its passage from said rolls, and means for rotating said rolls.

4. In a paper-folding machine, the combination with means for supporting a pile of sheets, of a pair of folding rolls, a rocking bar in which one of said rolls is journaled, two small rods on the face of said rocking bar, said rods having turned ends adapted to hold a sheet passing between said rolls away from said bar and guide it in its passage from said rolls, and means for rotating said rolls.

5. In a paper-folding machine, the combination with a frame, a pair of horizontally-arranged folding rolls journaled therein, and means for driving said rolls, of a support secured upon said frame and projecting over the said rolls, a vertically-movable rod held in said support, a blade secured to said rod and adapted to force a sheet of paper between said rolls, a spring secured to said rod and adapted to force the rod downward, a pivoted bent lever at the side of said frame, an arm connected with said lever and adapted to move said rod and attached blade up against the pressure of the spring, a rock-shaft, and an arm attached thereto adapted to move said bent lever.

FREDERICK G. NIND.
FREDERICK JULYAN.

Witnesses:
MINNIE A. HUNTER,
ALBERT H. ADAMS.